Nov. 17, 1953  A. B. RADER  2,659,474
ARTICLE TRANSFER FOR CARTON TAPING MACHINES
Filed April 25, 1950
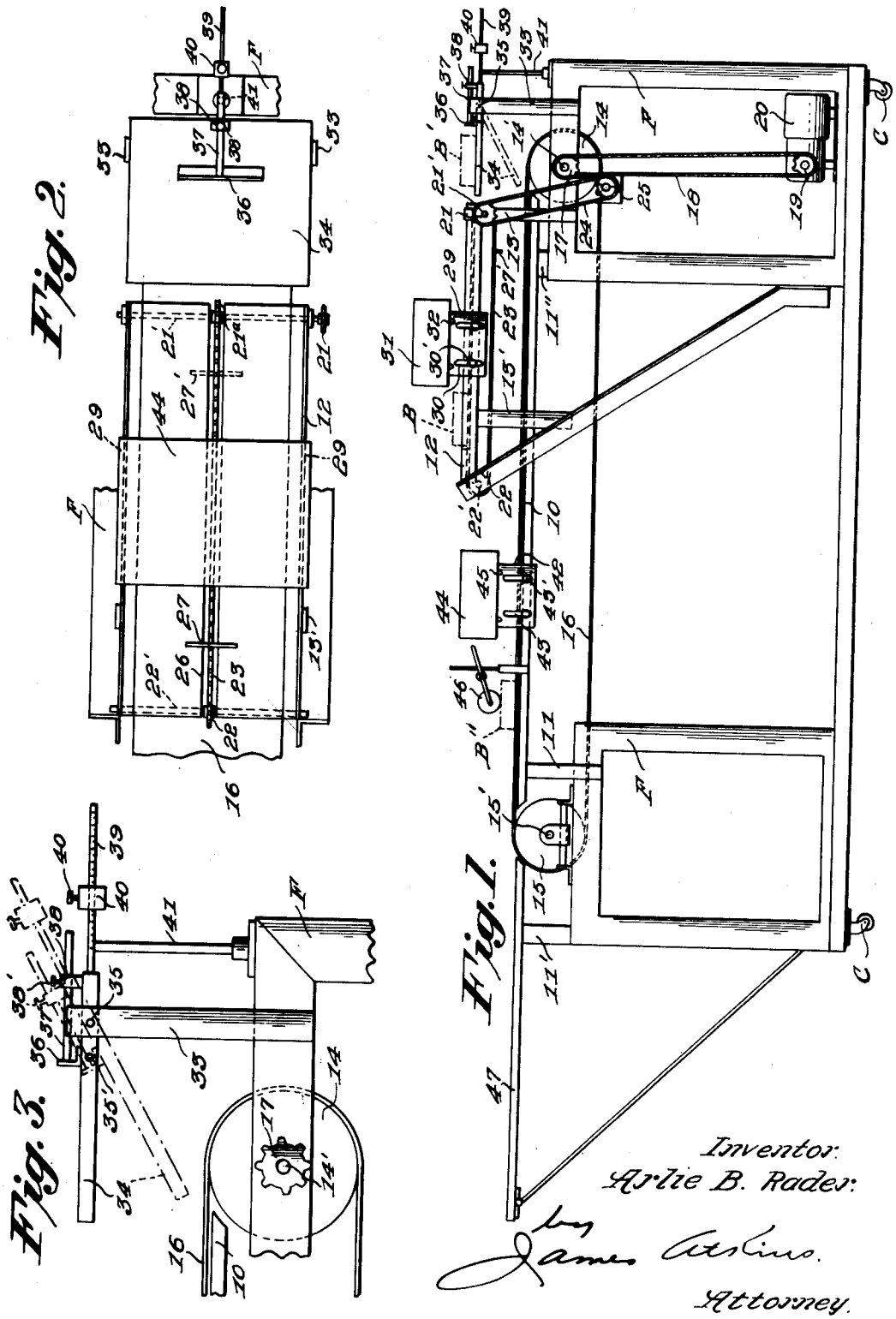
Inventor:
Artie B. Rader:
James Atkins.
Attorney.

Patented Nov. 17, 1953

2,659,474

UNITED STATES PATENT OFFICE 2,659,474

ARTICLE TRANSFER FOR CARTON TAPING MACHINES

Arlie B. Rader, Lititz, Pa.

Application April 25, 1950, Serial No. 157,997

2 Claims. (Cl. 198—27)

This invention relates to a carton taping machine.

An object of the invention in its broadest aspect is to provide a machine for successively taping the body and cover of a carton on opposite sides thereof and in a continuous operation.

A further object of the invention is to provide a carton taping machine having a relatively light frame provided with casters for ready transportation of the machine from one place to another.

A still further object of the invention is to provide a continuously operative machine for taping the cover and body portion of a carton on opposite sides thereof and in successive operations, and wherein weighing means are provided for preventing the second taping operation in the event that any particular carton contains underweight contents.

A still further object of the invention is to provide an automatic dual taping machine for cartons which embodies spaced taping devices operative in succession, together with counting and code dating means in the path of movement of cartons past the taping devices and beyond the second taping device.

Other objects and advantages of the invention will become apparent in the course of the following detailed description, taken in connection with the accompanying drawing, wherein—

Figure 1 is a side elevational view of the machine in accordance with a preferred structural embodiment thereof.

Fig. 2 is a fragmental top plan view of the right hand portion of Fig. 1.

Fig. 3 is a fragmental side elevational view corresponding to the upper right hand portion of Fig. 1.

Referring now in detail to the drawing, the machine embodies a suitable frame F which, as shown in Fig. 1, is of open skeleton construction for lightness, and it is provided with suitable casters C for movement thereof to and from various desired positions of operation.

The frame includes a belt support 10 connected by vertical portions 11, 11', and 11'' to main frame portions therebeneath.

A table 12 is disposed above the support 10 and is suitably connected thereto as by means of vertical frame members 13, 13'.

A roller 14 is supported on a transverse shaft 14' rotatably supported by the frame F adjacent the right hand or forward end thereof, and a similar roller 15 is supported on a transverse shaft 15' rotatably supported by the frame adjacent its rear end. A relatively wide rubberized belt 16 is trained over the rollers 14, 15 with the upper reach thereof riding over the support 10.

A sprocket wheel 17 is secured to one end of shaft 14' which is operatively engaged by a sprocket chain 18, which is further operatively engaged with a second sprocket wheel 19 driven by a motor 20.

Transverse shafts 21' and 22' are rotatably supported adjacent opposite ends of the table 12.

A sprocket wheel 21 is secured to shaft 21' adjacent one end thereof and a second sprocket wheel 21a is secured to this shaft intermediate its ends. A sprocket wheel 22 is secured to shaft 22' intermediate its ends and a sprocket chain 23 is operatively engaged with the sprocket wheels 21a, 22.

A sprocket chain 24 is operatively engaged with the sprocket wheel 21 and an idler sprocket wheel 25 suitably journaled on the frame.

As can be seen in Fig. 1 the sprocket chains 18 and 24 are in frictional engagement whereby the chain 24 is normally driven by the motor operated chain 18, but excess load on chain 24 will result in relative slipping of chains 18 and 24, as will later appear.

The table 12 is provided with a central slot 26 in which the sprocket wheels 21a, 22 and the chain 23 are disposed and the chain 23 is provided with a pair of carton-engaging cleats 27, 27'.

A pair of plates 29 are supported for vertical adjustment at opposite sides of table 12, as by means of slots 30 and suitable clamping bolts 30'.

A taping device 31 is removably secured on the upper edges of plates 29, as by means of a pair of pins 32 carried by the device and having free seating engagement in corresponding recesses in the upper edges of the plates. The purpose of the adjustable plates is to provide for adjustment of the taping device for different size cartons to be taped.

The frame includes a pair of vertical members 33 between which, adjacent their upper ends, is disposed a platform 34. The platform is normally in substantial horizontal alignment with table 12, and it is provided with transversely aligned apertures for receiving pivot pins 35 for pivotal support of the platform on the members 33, and the platform is provided with other apertures 35' to selectively receive the pivot pins 35 to adjust the platform for different sized cartons.

A stop 36 is transversely disposed on the platform 34 and same is adjustable toward and from the table 12, as by means of a rod 37 extending through a block 38 fixed on the platform and having a set screw 38'.

A scale bar 39 extends from the forward end of the platform 34, and a weight 40 is slidably supported on the bar and is provided with a set screw 40' for securing same in any desired adjusted position.

A bar 41 extends upwardly from the frame and serves as a rest for the bar 39 when the platform 34 is in normal horizontal position.

A pair of plates 42 corresponding to plates 29 are disposed at opposite sides of support 10 and are vertically adjustable as by means of slots 43 and clamping bolts 43'.

A second taping device 44 is removably supported on the upper edges of plates 42 as by means of a pair of pins 45 carried by the device and seating in corresponding recesses in the upper edges of the plates.

A code dating and counting device 46 is supported from the support 10 rearwardly of the second taping device 44 and a packing table 47 is disposed rearwardly of roller 15 and in horizontal alignment with the support 10.

Having described the construction of the machine in accordance with a preferred embodiment thereof, the operation is as follows:

With the motor 20 set into operation, the belt 16 will be driven with the upper reach thereof traveling toward the packing table 47. The chain 18 will impart movement to chain 24 which, through sprocket wheel 21, will drive the chain 23 with the upper reach thereof in the direction of the platform 34.

The cartons will be packed at the position of the one designated B in Fig. 1, and when the cleat 27 engages such carton it will be moved through the taping device 31 which will tape the cover to the body of the carton at one side thereof.

The thus partially taped carton will be carried forwardly by the cleat 27 until it is deposited on the platform 34, as is indicated at B'.

At this point, it is to be noted that the scale weight 40 is adjusted as well as is the stop 36 for a particular carton, such that if it contains the proper volume of packed contents, it will tip the platform to the dotted line position, whereby the carton will slide into the travel belts 16.

The carton will be carried by the belt 16 through the second taping device 44 which will tape the cover and body of the carton at the opposite side thereof.

The completely taped carton will then be counted and code dated by the device 46, as at B'', and will then be moved to the packing table 47.

Should any carton, however, be under-weight upon reaching the platform 34, it will not tip the platform and accordingly will not be transferred to the belt for its second taping operation.

The operator filling the cartons will readily observe any carton remaining on the platform and will immediately remove it.

The two cleats 27, 27' successively engage a carton for carrying it to the platform 34 and should the operator happen to place two cartons in advance of either cleat the load resistance will cause relative slip between the chains 18 and 24 and accordingly the cartons will not be advanced.

The adjustable stop 36 and the adjustable taping device supporting plates 29 and 42 provide for conditioning the machine for efficiently handling cartons of various sizes in a relatively short period of time.

Due to the light frame F and the supporting casters C, the machine may easily and quickly be moved to any desired operating positions.

While I have disclosed my invention in accordance with a single specific embodiment thereof, such is to be considered as illustrative only, and not restrictive, the scope of the invention being defined in the following claims.

I claim:

1. In a carton-taping machine, a transportable frame, a horizontal belt support carried by the frame, a horizontal table disposed above the support and carried by the frame, an endless chain conveyor for conveying cartons in one direction having one reach thereof movable over the table, a belt conveyor having one reach thereof movable over the support for conveying cartons in an opposite direction, means for imparting movement to the conveyors, and a weighted pivotally supported platform normally alined with the chain conveyor and being swingable to a position for transferring the cartons therefrom to the belt conveyor when the cartons are of a predetermined weight, said means for imparting movement to the conveyors comprising a pair of frictionally engaged chains, and a motor for driving one of the chains.

2. In a machine of the character described, first means for conveying filled cartons in succession in one direction and comprising an endless chain provided with spaced carton-engaging cleats, second means for conveying the filled cartons in an opposite direction and comprising an endless belt, and carton-transfer means disposed at corresponding ends of said conveying means for transferring the cartons from the first conveying means to the second conveying means, said first conveying means being disposed above and parallel with said second conveying means with one end of the latter projecting beyond the corresponding end of the former, and said transfer means comprising a weighted flat platform pivotally supported adjacent one edge thereof and being normally disposed in alinement with the upper run of said endless chain, the platform pivoting under weight of a filled carton toward the second conveying means for movement of the carton onto same, and means for imparting simultaneous movement to said chain and said belt.

ARLIE B. RADER.

References Cited in the file of this patent

UNITED STATES PATENTS

| Number | Name | Date |
|---|---|---|
| 512,377 | Hooper | Jan. 9, 1894 |
| 562,534 | Hollingsworth | June 23, 1896 |
| 750,259 | Coffelt | Jan. 26, 1904 |
| 1,043,548 | Stender | Nov. 5, 1912 |
| 1,141,048 | Fazackerley | May 25, 1915 |
| 1,435,263 | Soubier | Nov. 14, 1922 |
| 1,461,707 | Hanson et al. | July 10, 1923 |
| 1,793,158 | Clayton | Feb. 17, 1931 |
| 2,028,479 | Spicer | Jan. 21, 1936 |
| 2,169,897 | Lueckel | Aug. 15, 1939 |
| 2,244,430 | Parsons et al. | June 3, 1941 |